3,329,100
BAKERY MACHINE
Gustave A. Seewer, Heimiswilstrasse 42, CH–3400,
Burgdorf, Bern, Switzerland
Filed May 10, 1965, Ser. No. 456,898
8 Claims. (Cl. 107—4)

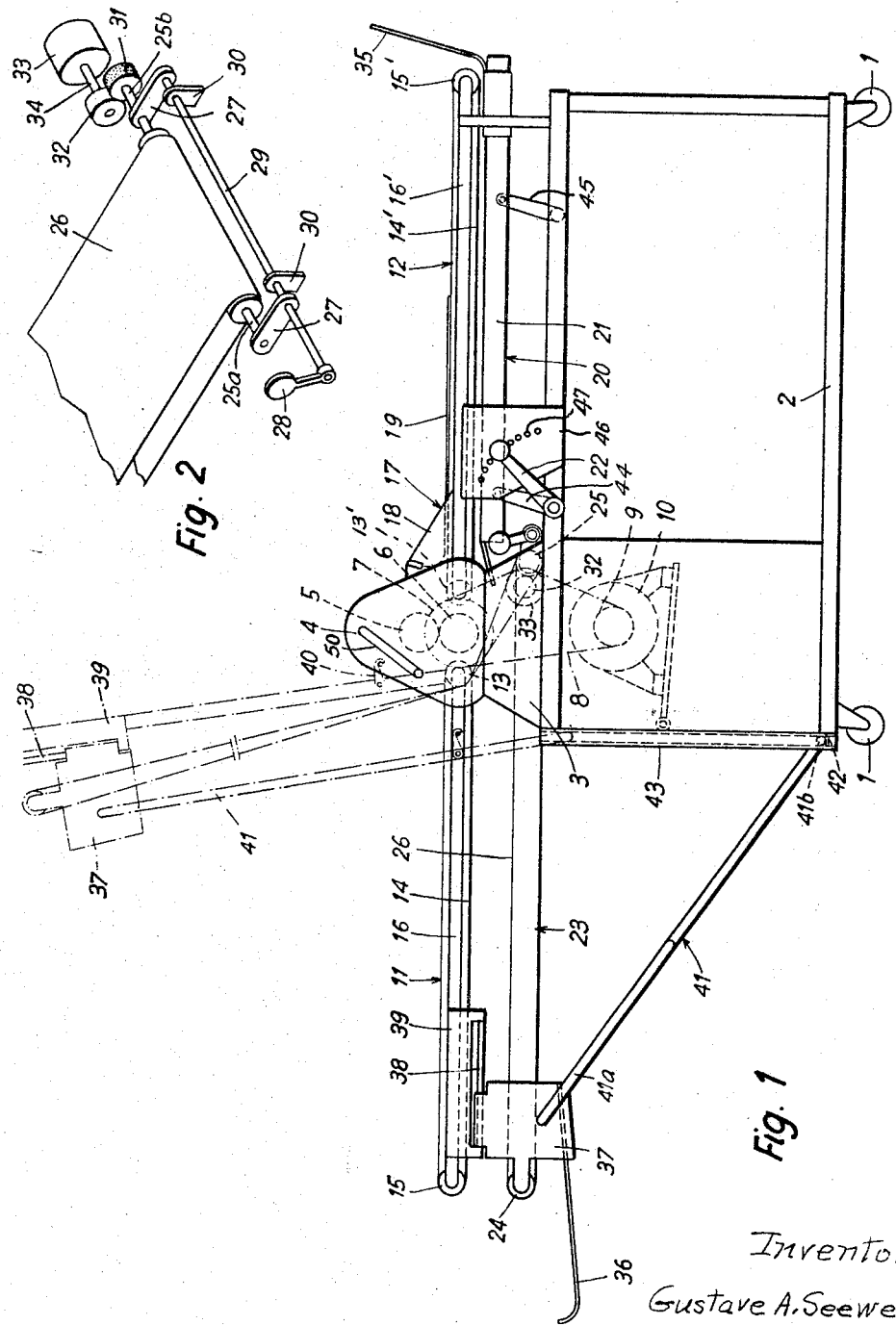

This present application is a continuation-in-part of application, Ser. No. 192,541, filed May 4, 1962 and now abandoned, in the name of the same applicant.

The present invention relates to an apparatus for treating dough in the making of baked food products such as bread, pastries, etc.

In the preparation of dough, various ingredients such as milk, eggs, flour, yeast, etc., are first mixed together to form a bulk mass having a pastry consistency. This mass of mixed ingredients is called the dough; however, in order to actually use this dough, it must be further worked or treated. This further treatment entails various operations, depending upon the specific type of dough and upon the product to be made therefrom. If the dough is to be used to make certain pastry products, it is necessary to flatten the bulk dough into the form of long sheets whose thinness depends upon the particular pastry product. For example, if doughnuts are to be made from the dough, it is sheeted to form relatively thick sheets, while if strudel dough is required, it is sheeted to a paper-thin thickness. On the other hand, if loaves of bread are to be made, it is necessary to only flatten individual chunks of the bulk dough and then mold the individual flat pieces into the form of loaves.

As is already known in the art, the respective sheeting and molding operations are each performed by respective apparatuses for this purpose called a sheeting machine and a molding machine. These machines are usually individual and separate from each other and they, therefore, occupy a considerable amount of floor space. Furthermore the operation of the molding machine usually requires at least two persons working together. Still further, in the case of a molding machine, the finished molded product, when it is discharged from the last molding stage, usually falls onto an inclined surface so that it rolls downwardly to an accessible collection tray. At least two disadvantages result from this arrangement: first, the rolling product becomes deformed as it rolls, and second, the operator must bend down to a considerable extent in order to reach the bottom of the inclined surface.

Since, in the smaller bake shops the conservation of space and of manpower and the speed of operation are important economic factors which could determine the economic success or failure of the business, it is a major object of the present invention to provide a combined sheeting and molding machine, which occupies substantially no more floor space than either type of machine alone would occupy. It is a further object to provide an apparatus which, when used as a molding machine, can properly be operated at a reasonable speed by only a single person working alone with that person remaining at only one location throughout the operation of the machine. It is a still further object to provide a convertible apparatus of this type wherein, when the apparatus is not in use, an entire portion thereof is swingable upwardly so as to reduce the overall floor length of the apparatus.

These objects are generally realized through the provision of a dough treating apparatus which is convertible from use as a sheeting machine to use as a molding machine and vice-vera. More specifically, the apparatus comprises in one unit all the necessary parts and features whereby it may selectively be operated as either a sheeting or as a molding machine, the parts being so arranged that a minimal adjustment is required on the part of the operator in order to convert from sheeting use to molding use and vice versa. Further, when the apparatus is being used as a molding machine, the inlet for the bulk dough and the outlet for the finished molded product are arranged in close proximity to each other so that a single person may feed bulk dough to the machine and intermittently remove the molded products therefrom while remaining at only one location and without having to bend down to any great extent in order to pick up the molded products.

The above stated objects and others will become apparent from the following detailed description of a preferred embodiment of the apparatus, which is referred to the accompanying drawing, in which:

FIGURE 1 is a side elevation view of a preferred embodiment of the convertible apparatus, and FIGURE 2 is a detailed view of a disengageable drive connection device of the apparatus.

With reference to FIGURE 1, the apparatus comprises a supporting framework or stand 2 which is movable by means of wheels or casters 1. Stand 2 comprises an upstanding support member 3 on either side of the stand for supporting the housing 4 of a conventional dough roller sheeting means. Such means comprises parallelly spaced rollers 5 and 6 and means to vary the spacing therebetween in order to form various thicknesses of dough sheets.

A pair of conveyors 11 and 12 are arranged in tandem, that is, one on either side of the rollers 5 and 6 to form a continuation of each other. The conveyors comprise continuous belts 14 and 14' each mounted over a driving roll 13 or 13' and an idler or driven roll 15 or 15'. An electric motor 10 is drivingly connected to the belts and to the sheeting rollers 5 and 6 through suitable driving connection means such as belt drive means 7, 8, and 9. The rolls 13, 13' and 15, 15' are suitably supported by a frame 16 which in turn is supported on stand 2.

The parts described thus far can be operated in order to perform the sheeting operation on a lump of bulk dough. In order to do this, the operator merely places a lump of dough onto the upper surface of either belt, 14 or 14', and operates the motor 10 and the driving means 7, 8, 9 in order to simultaneously drive the belts and the rollers 5 and 6. It should here be noted that the driving connection between motor 10 and the belts 14 and 14' is such that both belts run simultaneously in the same direction. Further, the rollers 5 and 6 run oppositely to each other but in directions corresponding to the direction of the belts 14 and 14' so that one belt feeds the lump of dough between the two rollers which in turn grip the dough, flatten it, and pass it out onto the other conveyor. A known means including a hand operable lever 50 is provided whereby the operator may simultaneously reverse the directions of the belts and of the sheeting rollers so that the dough may be passed back and forth through the rollers 5 and 6 a plurality of times without having to remove the dough from either belt. As the dough is being passed back and forth, the operator may also progressively bring the rollers 5 and 6 closer together thereby causing the dough sheet to become thinner each time it passes between the rollers.

It is further to be noted that, during the sheeting process, the sheet of dough becomes progressively larger in planar area, thereby necessitating that the belts 14 and 14' be long enough to accommodate the increasing size of the dough sheet. Still further, during the sheeting process, there is occasion for the operator to perform various operations on the dough while it is on the belts 14, 14'. For example, he must sometimes stop the machine and fold the sheeted dough over onto itself and then pass it between the rollers again. Or, the operator may add certain ingredients, such as butter onto the sheet of dough and then pass the dough through the rollers to roll the butter into the dough. After the sheeting has been completed, the operator may wish to cut the sheet into various forms, such as doughnut forms, etc. In any case, the top of the belt 14, 14' must also serve as a work table for the operator. Therefore, the height of the belt upper surfaces is generally waist-high, that is, the normal height for a person to work on the dough.

With regard to the fact that the belts 14 and 14' also serve as a work table, it is to be noted that the apparatus defines in top plan view a substantially rectangular structure wherein the respective outer ends of the first and second conveyors (11 and 12) correspond substantially to the extreme opposite ends of the apparatus. Furthermore, the sides of the belts 14 and 14' substantially constitute the lateral extremities of the apparatus. In this regard, it is further noted that the apparatus includes no obstructions or protrusions at the ends or sides thereof, so that a person may freely move around the ends of the apparatus, from one side to the other, while always remaining within working reach of the belt upper surfaces.

Since the sheeting operation is a reversible one; that is, since the belts 14 and 14' successively serve as feeding and receiving belt for dough passing between rollers 5 and 6, it is essential that the upper surfaces of these belts at their inner ends, that is, where the belts pass over inner rolls 13, 13', be in the same horizontal plane. The belts themselves need not be strictly horizontal. In fact, they may incline either upwardly or downwardly away from the rolls 13, 13'. Furthermore, the rolls 13, 13' and 15, 15' for one belt may be of a different diameter than the corresponding rolls for the other belt. But, the important feature, in order that the sheet of dough may be reversibly passed in either direction between the rollers 5 and 6, is that the inner belt rolls 13 and 13' have their uppermost surfaces in the same horizontal plane.

It is also noted, that in advanced sheeting machines, the belts 14 and 14' are operated at different speeds relative to each other.

When it is desired to convert from the sheeting operation as described above to a molding operation, only three extremely simple adjustments are required. First, the operator must place the dough curling attachment 17 in operating position on the apparatus. This attachment 17 comprises connecting member 18 and a chain or rubber carpet or other known type of curling device 19 which is attached to member 18. Member 18 may either be detachably mountable on the apparatus or simply pivotably attached thereto, as by being pivotably attachable to the housing 4 of the sheeting rollers. In any event, while the apparatus is used as a sheeting machine, curling attachment 17 is inoperative and is therefore either entirely removed from the apparatus or is otherwise rendered inoperative. On the other hand, when the apparatus is converted to a molding machine, the attachment 17 is placed in operative position, which means that the carpet 19 is placed over the upper surface of belt 14' so as to cooperate therewith in curling a flattened piece of dough which is discharged from the rollers 5 and 6.

The second adjustment which the operator must perform in converting to a molding machine is to set the metal strip 21 of the molding attachment 20 at the proper distance from the bottom surface of belt 14'. This is done simply by moving hand operable lever 22, the free end of which can lockingly engage either of various openings in a stationary bracket mounted on stand 2. As shown in the exemplary embodiment of FIGURE 1, the strip 21 is supported by two parallel links 44 and 45. The lever 22 is pivotable about a fixed pivot axis on the stand 2, and lever 22 is rigid with link 44 so that link 44 pivots together with lever 22. Bracket 46 is rigidly secured to stand 2 and includes an arcuately arranged series of holes 47 into each of which a detent of conventional construction on the outer end of lever 22 may be selectively inserted to maintain strip 21 at various selected positions relative to the lower surface of belt 14'.

The third and final adjustment which must be made by the operator is that of drivingly activating the third conveyor 23. This is done through actuation of an appropriate clutch means which drivingly connects the third conveyor 23 with the driving motor 10. While the apparatus is operated as a sheeting machine, the conveyor 23 is stationary because the clutch means is actuated to disconnect this conveyor from the motor 10.

Conveyor 23 comprises a belt 26 mounted over and between drive roll 25 and driven roll 24. The driving connection between belt 26 and motor 10 is such that belt 26 is driven in a direction opposite to that in which motor 10 drives belts 14 and 14'.

The inner end of belt 26 is located vertically below the inner or discharge end of the molding attachment 20 so that the molded pieces of dough which are discharged from the molding attachment fall directly onto the beginning or inner end of belt 26. Belt 26 moves from right to left in FIGURE 1 so that it carries the pieces of molded dough towards the left until they fall off belt 26 and into tray 36.

When operating this apparatus as a molding machine, the operator stands generally near the left end (with regard to FIGURE 1) of the apparatus and places lumps of bulk dough onto the left end of belt 14 while belts 14 and 14' are both moving from left to right. The lump of dough is therefore carried by belt 14 to between rollers 5 and 6 which flatten it and discharge it onto belt 14'. Belt 14' carries the dough away from the rollers 5 and 6; however, the carpet 19 cooperates with upper moving surface of belt 14' to curl the dough into a roll. The curled or rolled up dough then falls off the right hand end of belt 14' and into deflector 35 which guides the roll of dough to between the lower moving surface of belt 14' and the upper surface of molding strip 21. The moving surface of belt 14' carries the dough roll towards the left while the molding strip 21 molds the dough roll to the proper length. Before reaching the inner end of the belt 14', the dough roll is discharged from the molding attachment and onto conveyor belt 26 which carries the molded roll to tray 36. Tray 36 is located closely below the left hand end of belt 14 so that the operator may easily reach into tray 36 to remove molded rolls therefrom intermittently as he also places lumps of dough onto belt 14.

It will be noted that in the preferred embodiment which is disclosed in FIGURE 1, the third conveyor belt 26 extends parallelly beneath the first conveyor belt 14 and that it moves in a direction opposite to that of either the first or second conveyor belts, and that the inner end of belt 26 is generally below the discharge end of the molding attachment 20. This constitutes the most practical and economical arrangement of parts and permits a one-man operation of the apparatus as molding machine.

One of the main features of the third conveyor 23, however, is that it assures that the molded roll will not be deformed or damaged after it is discharged from the molding attachment. The third conveyor assures that the molded roll will be carried from the molding attachment to a collection point, such as tray 36, without the roll undergoing any further rolling.

This important feature would also be served if conveyor 23 were to extend oppositely to the direction of that shown in FIGURE 1; that is, if conveyor 23 were to extend under the second conveyor belt 14' and discharge the rolls into a tray at the right hand end of the machine. Of course, this would necessitate a second man to operate the machine or in the case of only one man he would have to move from the left end to right end of the machine.

Another possible alternative is that of having the third conveyor belt 26 extend the full length of the machine and be reversible so that it could carry the molded rolls to either the left or right end of the machine.

Still another possible alternative is to have the molding attachment 20 located above, instead of below, the second conveyor belt 14' so that it would cooperate with the upper surface of said conveyor 14' to mold the dough roll. In this case, the third conveyor 23 necessarily would have to extend substantially from one end to the other end of the machine in order to carry the molded roll from the right end of conveyor belt 14' to approximately the left end of conveyor belt 14.

With reference to the driving connection between driving roll 25 of belt 26 and the motor 10, it is noted in FIGURE 2 that roll 25 has a stub shaft 25a, 25b rigidly extending either end thereof. Each stub shaft is rotatably journalled in one end of arms 27 which are fixed at their opposite ends to shaft 29. A hand lever 28 is also rigidly fixed to shaft 29 which in turn is rotatably mounted in supports 30 which are fixedly mounted on stand 2. A friction roller 31 is fixed to one end of shaft 25b, and in the operational position shown in FIGURE 2, roller 31 is frictionally engaged with a second friction roller 32. The second friction roller 32 is rigid with one end of stub shaft 34, the other end being rigid with pulley wheel 33. Shaft 34 is rotatably journalled to the machine stand 2 in a conventional manner and pulley wheel 33 is driven by suitable connection to belt 8. For example, belt 8 may run over pulley wheel 33.

The journals of roll 24 are mounted on plates 37 which are rigidly interconnected and mounted to be longitudinally movable on fixed bars 38. The latter's ends are secured to plates 39 which in turn are secured to the housing parts 4. When the machine is not in use, the entire conveyor 11 may be swung high about the axis of its roll 13 and then secured in this position by means of hooks 40, as shown in FIGURE 1 by dash-and-dot lines. During this folding movement, the plates 37 are moved on the bars 38. The two strands of belt 26 are laid against the roll 13 of conveyor 11. A strut 41, the yoke-shaped portion 41a of which through its ends is articulated to the plates 37, has a T-shaped end-portion 41b which, when the machine is in the position of use, is supported on the lower end 42 of a guide rail 43 of C-shaped cross-section, which rail forms a portion of stand 2. When the conveyor 11 is folded upwardly to its high position, said end 41b is vertically shifted in guide rail 43.

It is to be understood that the herein described preferred embodiment is intended to be illustrative and not limitative of the scope of the invention, which is defined in the appended claims.

What is claimed is:

1. A dough-treating apparatus which is alternatively operable as either a dough sheeting machine or as a dough molding machine, comprising: a stand, sheeting rollers mounted on said stand, first and second conveyors respectively arranged on either side of said rollers, said conveyors having respective outer ends remote from said rollers and respective inner ends adjacent to either side of said rollers, said conveyors comprising respective upper and lower runs, drive means to simultaneously drive said conveyors and thereby move said upper runs in the same direction and to drive said rollers in a direction to correspond to the direction of movement of said upper runs, the inner ends of both of said upper runs lying in the same horizontal plane, means to simultaneously reverse the direction in which said upper runs and said rollers are driven by said drive means, said upper runs being respectively adapted to feed dough to and to carry dough away from said sheeting rollers in either of two opposite horizontal directions in correspondence to the direction of movement of said runs, curling means mounted on said stand above said second conveyor and being selectively positionable to either a cooperating or a non-cooperating position relative to said second conveyor, said curling means when in said cooperating position cooperating with the said upper run of said second conveyor to curl dough which is discharged from said sheeting rollers whereby the dough may be advanced back and forth through said sheeting rollers when the curling means is in said non-cooperating position, an adjustable molding attachment located entirely below the lower run of said second conveyor cooperable with said second conveyor lower run to mold the curled dough as it is advanced by said lower run of second conveyor, said second conveyor having a discharge point where dough falls from contact with said second conveyor after having been carried between said second conveyor and said molding attachment, a third conveyor extending below said discharge point, and means to drive said third conveyor.

2. The apparatus of claim 1, said lower run being adapted to move in a direction opposite to the upper run of said second conveyor, means to receive dough from the outer end of said second conveyor and to guide the dough to between said lower run and said molding attachment.

3. The apparatus of claim 2, wherein said third conveyor extends from said discharge point to a point in close proximity to the outer end of said first conveyor, drive means to move said third conveyor in the same direction of movement as the lower run of said second conveyor.

4. The apparatus of claim 1, wherein said means to drive said third conveyor is selectively operable to either drive said third conveyor or to stop the driving of same while said first and second conveyors are being driven.

5. The apparatus of claim 1, wherein said first and second conveyors comprise endless transporting belts, the upper runs of said belts being substantially waist-high relative to a person whereby said upper runs constitute a work table for a person who is manipulating dough on said upper runs.

6. The apparatus of claim 5, said apparatus defining a substantially rectangular structure in top plan view, the respective outer ends of said first and second conveyors corresponding substantially to the extreme opposite ends of said structure and the sides of said first and second conveyors being substantially vertically aligned with the sides of said structure, whereby a person may freely move around the ends of said structure from one side to the other thereof while remaining in working proximity to the said upper runs of said first and second belts .

7. An apparatus for treating dough comprising a stand, a pair of dough sheeting rolls mounted on said stand, means for varying the distance between said sheeting rolls, first and second conveyors each of said conveyors being provided with a pair of guiding rolls enclosed by a first and second conveyor belt, respectively, said first conveyor having one end remote from said sheeting rolls and adapted to feed dough to said sheeting rolls and said second conveyor adapted to receive dough after treatment by said sheeting rolls, means for rolling up the dough after passage of same through said sheeting rolls mounted above said second conveyor, a molding attachment arranged below said second conveyor, a third conveyor including a conveyor belt having at least one end remote from said sheeting rolls and provided with a pair of guiding rolls enclosed by said conveyor belt, said third conveyor extending below the entire length of said first conveyor and said sheeting rolls and adapted to receive dough from said molding attachment, the end of said third conveyor remote from said sheeting rolls being substantially in alignment with the end of said first conveyor remote from said pair of sheeting rolls; and wherein said first conveyor contains a rigid frame and is upwardly foldable about the axis of the one of said pair of rolls of said first conveyor adjacent said sheeting rolls, the one of said pair of guiding rolls of said third conveyor located at the end remote from said pair of sheeting rolls being supported by rigidly interconnected plates, said plates mounted for longitudinal movement on said rigid frame, the apparatus comprising furthermore a strut and a vertical guide rail attachment vertically to said stand, the one end of said strut being articulated to said plates, and the other end of said strut being received for longitudinal movement within said rail, said rail being closed at its lower end.

8. An apparatus for treating dough comprising a stand, a pair of dough sheeting rolls mounted on said stand, means for varying the distance between said sheeting rolls, first and second conveyors each of said conveyors being provided with a pair of guiding rolls enclosed by a first and second conveyor belt, respectively, said first conveyor having one end remote from said sheeting rolls and adapted to feed dough to said sheeting rolls and said second conveyor adapted to receive dough after treatment by said sheeting rolls, means for rolling up the dough after passage of same through said sheeting rolls mounted above said second conveyor, a molding attachment arranged below said second conveyor, a third conveyor including a conveyor belt having at least one end remote from said sheeting rolls and provided with a pair of guiding rolls enclosed by said conveyor belt, said third conveyor extending below the entire length of said first conveyor and said sheeting rolls and adapted to receive dough from said molding attachment, the end of said third conveyor remote from said sheeting rolls being substantially in alignment with the end of said first conveyor remote from said pair of sheeting rolls; and furthermore comprising a shaft mounted on said stand, arms, said arms mounted on said shaft, a hand lever fixed to said shaft, one roll of said pair of guiding rolls of said third conveyor adjacent to said pair of sheeting rolls being mounted on said arms, a first friction roller connected coaxially with said roll of said third conveyor, a second friction roller engageable with said first friction roller by actuation of said hand lever, a pulley connected with said second friction roller, and driving means and belts to drive said pulley.

References Cited
UNITED STATES PATENTS

| Re. 17,711 | 6/1930 | Scruggs | 107—9 |
| 2,275,714 | 3/1942 | Anetsberger et al. | 107—12 |
| 2,642,012 | 6/1953 | Sticelber | 107—9 |
| 2,859,712 | 11/1958 | Kissinger | 107—9 |
| 3,023,714 | 3/1962 | Seewer | 107—12 |

WILLIAM I. PRICE, *Primary Examiner.*

WALTER A. SCHEEL, WILLIAM PRICE, *Examiners.*

J. SHEA, *Assistant Examiner.*